J. WETTSTEIN.
CIGAR MACHINE.
No. 97,255.
2 Sheets—Sheet 1.
Patented Nov. 23, 1869.
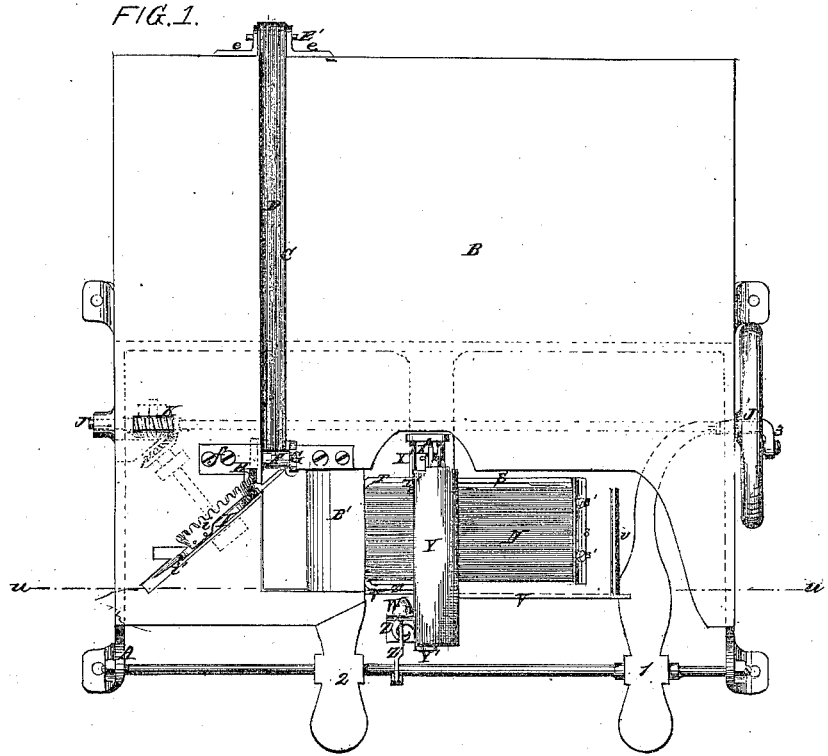
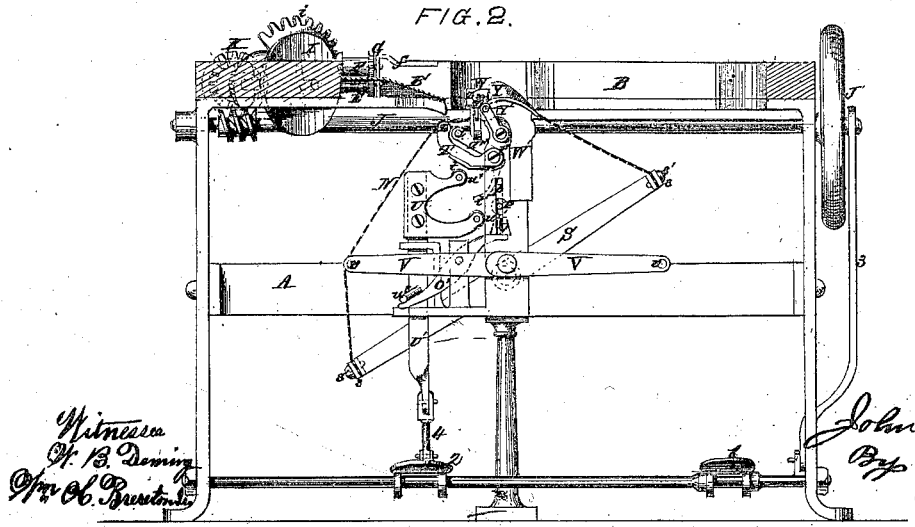

2 Sheets—Sheet 2.
J. WETTSTEIN.
CIGAR MACHINE.
No. 97,255.        Patented Nov. 23, 1869.
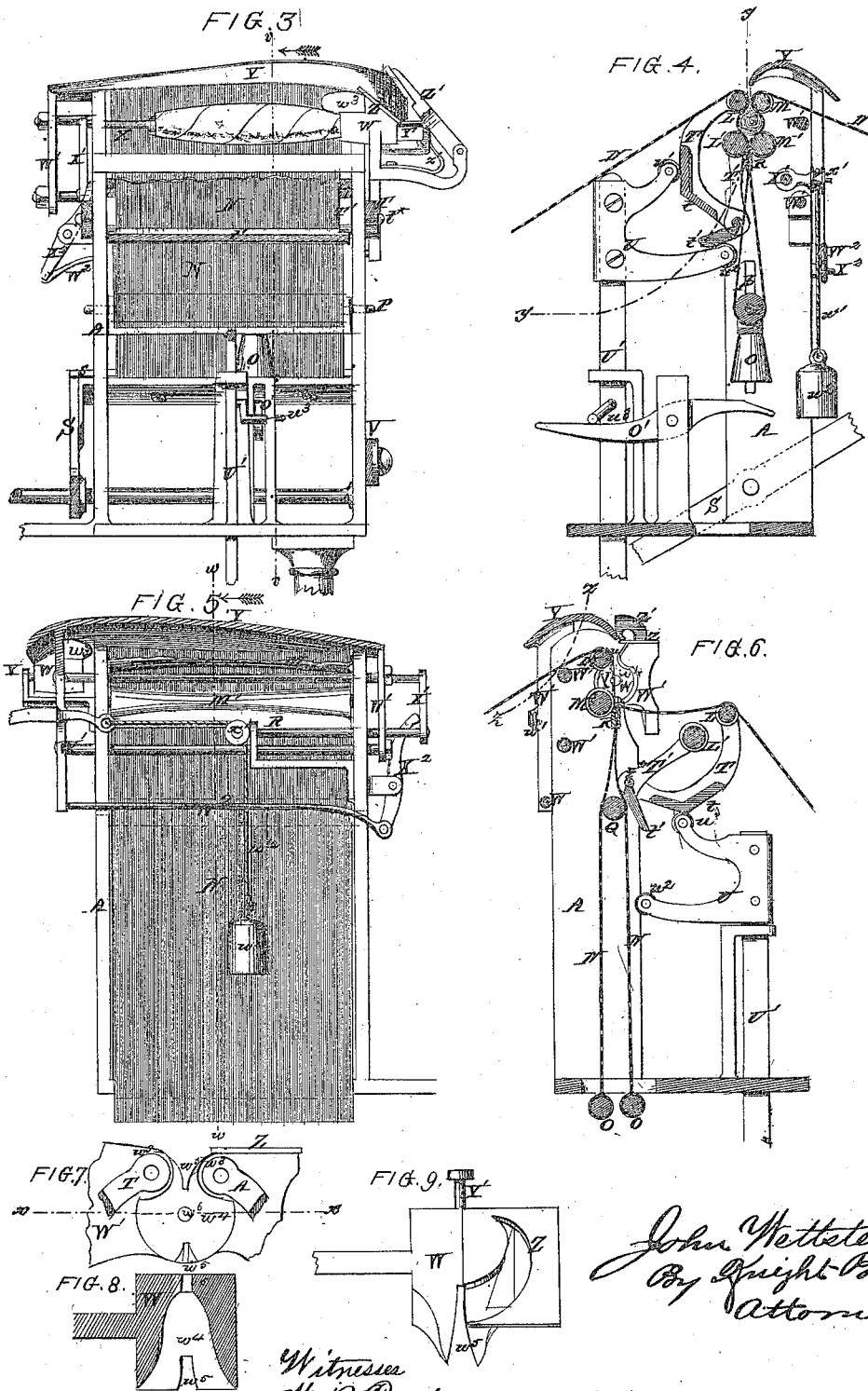

United States Patent Office.

JOHN WETTSTEIN, OF BALTIMORE, MARYLAND, ASSIGNOR TO HIMSELF AND JOHN THOMAS HENNAMAN, OF SAME PLACE.

*Letters Patent No. 97,255, dated November 23, 1869.*

CIGAR-MACHINE.

*The Schedule referred to in these Letters Patent and making part of the same.*

I, JOHN WETTSTEIN, of Baltimore, in the State of Maryland, have invented certain new and useful Improvements in Cigar-Machines, of which the following is a specification.

Nature and Objects.

The object of my invention is to provide mechanism for performing the several parts of the operation of making cigars, combining maximum simplicity and compactness with efficiency, and adapted to roll and wrap the cigars in a manner similar to hand-work.

The tobacco to make the filler being sorted on a suitable table, and arranged in a groove or channel of proper capacity therein, is fed by a properly-actuated endless apron and feed-rollers, at proper intervals, and cut off in proper shape, being received on a suitable table, from which, at the proper moment, it is slid into the mould while in an open position.

The mould is formed by a belt or belts, in connection with suitably-shaped rollers or supporting-points, external thereto, being closed at its bottom by said belt or belts working through a contracted slot, and its sides drawn together by a suitably-applied weight or weights, or their equivalents, which are automatically lifted, to slacken the belt or belts, and facilitate the removal of the cigar on the opening of the mould for that purpose.

The rollers or supporting-points, four in number, employed to determine the shape of the mould, are arranged in two pairs, respectively mounted in fixed and movable bearings. By the adjustment of the latter, the mould is opened and closed.

The bearings of said movable rollers are separate and separately actuated, the upper being advanced first to close the mould, and the lower subsequently, motion being imparted to them at the proper relative times by a properly-formed cam, from the vertically-sliding stem of which the motion to lift the weights, or their equivalent, employed to press together the sides of the mould as aforesaid, is taken.

The filler is rolled by the reciprocation of said belt or belts by suitable means, the portions forming the respective sides of the moulds moving in opposite directions, thus rolling the filler in the same manner as by hand.

A regulator, consisting preferably of a pair of pivoted struts or levers, adjustable by set-screws, or their equivalent, to any desired angle, and provided at their outer ends with arms, over which, when they engage with the belts, the belts pass, serves to determine the action of the mould, and to admit of the variation of such action.

At the proper point of the operation, a header, consisting of a bell-shaped mould, is advanced to engage with the cigar, a stud or pin moving simultaneously therewith, and toward it, serving to hold the cigar in it until its head is formed, said header and pin being connected by suitable means, to cause them to move together, as stated, advancing automatically, on being released from a suitable detent by a suitably-applied weight, or its equivalent, and retracted by a treadle or handle, suitably applied to either.

To properly taper the cigar, the body-mould is contracted at its juncture with the matrical portion of the header, by a suitable slot therein, through which the belt or belts forming said mould pass, said slot at the top of the header also serving to permit of the proper introduction of the wrapper for the head.

The wrappers being prepared by cutting them of the proper width, are applied by inserting the end of one between the filler and one side of the mould at the point of the filler, and wrapping it, by the rotation of the filler, by the motion in one direction of the belt or belts forming the mould, its end to wrap the head being cut of the proper shape by a die or punch, applied to the header.

A stationary pin, projecting axially within the header, serves as a guide in bringing the wrapper to a proper point.

A rounded plate, of suitable form, applied to and forming a part of the frame of the header, serves, by the wrapper being drawn over it, to remove any wrinkles or creases there may be therein, and to guide it properly.

A single movement of the belts forming the lining of the mould being all that is required to apply a wrapper, the machine, by its reciprocating motion, is adapted to make both "rights" and "lefts," the different wrappers being applied in the respective movements of the belts, and both with equal facility properly applied.

My improvements consist in certain constructions and combinations of parts by which the objects and results above enumerated are effected, as hereinafter specifically set forth.

Description of Drawing.

In the accompanying drawing—

Figure 1 represents a plan view of a cigar-machine embodying my improvements, in illustrative form.

Figure 2 is a front elevation of the same, with the table in vertical section, on the line $u$ $u$, fig. 1.

Figure 3 is a longitudinal sectional elevation, on an enlarged scale, of the moulding-mechanism and its adjuncts detached.

Figure 4 is a vertical transverse section of the moulding-mechanism and adjuncts, on the same scale as fig. 3, taken on the line $v$ $v$, fig. 3, looking in the direction of the arrow.

Figure 5 is a longitudinal sectional elevation, on the same scale as figs. 3 and 4, of the moulding-mechanism and adjuncts, under a modification, two belts being employed to form the mould, instead of one, as in figs. 1 and 4, being further taken from the opposite side of the mechanism from fig. 3.

Figure 6 is a vertical transverse section of the moulding-mechanism and adjuncts, as represented in fig. 5, taken on the line $w\ w$, said figure, looking in the direction of the arrow.

Figure 7 is a front sectional elevation of the header and its adjuncts, about full size.

Figure 8 is a horizontal section of the header, on the line $x\ x$.

Figure 9 is a plan view of the header and its adjuncts, on the same scale as fig. 7.

The curved dotted lines $y\ y$ and $z\ z$, figs. 4 and 6, indicate the portions shown in said figures, which are omitted in figs. 3 and 5.

General Description.

In the drawing—

A represents the frame of the machine, and B, the table, which forms the top of the frame A, and serves, in connection therewith, to support the operative parts of the machine, both being suitably constructed for this purpose.

C represents the groove or channel in the table B, for the reception of the filler-tobacco;

D, the feeding-band, running in said groove or channel C;

E E', the rollers over which the band D runs;

F, an additional roller, forming, in connection with the roller E, the feeding and pressing-rollers, employed, in connection with the band D, to press and feed the strip into which the filler-tobacco is preliminarily moulded; and B', the inclined table or receiver, onto which the strip formed and fed by the groove C, and band D, and rollers E F, passes.

$e\ e$ represent the bearings of the roller E';

$f\ f$, those of the rollers E F.

G represents cog-wheels, connecting the shafts of the rollers E F;

H, an additional toothed wheel, on the shaft of the roller E, for the reception of the feed-motion.

I represents the combined spur-wheel and knife, employed to convey, by a segmental series of teeth, $i$, the feed-motion to the feed-rollers E F and band D, through the toothed wheel H, and, by a blade, $i'$, to cut the strip of filler-tobacco into suitable lengths or lumps; being arranged diagonally or obliquely with reference to the groove C, so as to sever the lumps by diagonal cuts, to enable them more readily to be rolled into shape. The rotary form or character of said knife is important, as rendering certain the complete severance of the strip, without raising and loosening the lumps, and also because of the comparative simplicity of the means required to operate it over reciprocating knives, which have, prior to my invention, been employed.

J represents a driving-shaft, for operating the combined spur-wheel and knife I, and K, gearing, for connecting the two, which may be of any suitable description.

L L' represent the movable, and M M', the fixed rollers or supporting-points, and N, the belts for forming the mould or rolling-mechanism.

O represents the weights employed to tighten the belts N; and

P, a roller, employed to support the lining below the mould, and to afford the requisite point for the attachment of the weights O, when but one belt is employed in the formation of the mould.

$p$, figs. 2 and 4, represents vertical guide-slots, for the lateral support of the roller P.

Q, fig. 6, represents a roller, preferably employed when two belts are used to form the mould, as represented in figs. 5 and 6, to support said belts apart, being arranged below the mould, as shown.

R represents the guide-slot, employed at or immediately below the lower rollers or supporting-points L' M' of the mould, to form the bottom of the mould, by holding together the two sides of the belt, or the two belts forming the lining of the same, and which may be formed in a transverse bar of the frame, as shown, or in other suitable manner.

S represents the double lever or rocking-frame, preferably employed to operate the belt or belts N, the two ends of which, or one end of each, are attached to its respective extremities in any suitable manner.

$s\ s$ represent flat bars or strips, applied externally of the ends of the lever S, and $s'\ s'$, set-screws, working through perforations in said strips $s$, and in female screws in said ends of the lever, forming clamps to attach the ends of the band or bands N to said lever S, and permit of their ready detachment, when desired.

T T' represent the swinging frames, in which the rollers or supporting-points L L' of the mould are mounted, to permit of the opening of the mould to receive the tobacco, and have the finished cigar removed. They may be of any suitable form which will give said rollers or supporting-points the requisite movement, and allow them to close properly around the mould.

$t^*$ represents the pivotal supporting-rod of the swinging frames T T', in the represented arrangement.

U represents the cam employed to close the rollers or supporting-points L L', through their frames T T';

U' being the vertically-sliding rod on which said cam is mounted, and $u^1\ u^2$, its bearing-points, by which, respectively, it operates said rollers or supporting-points L and L', being so adjusted relatively to each other as that the cam shall close said rollers or supporting-points in the order required, the upper, by which the mould is closed first, the lower subsequently.

$t\ t'$ represent the bearing-surfaces, provided on the swinging frames T T' for the engagement of the bearing-points $u^1\ u^2$ of the cam U, being arranged in any suitable manner.

O', figs. 2 and 4, represents the lever, provided for lifting the weight or weights O, by which the sides of the lining of the mould, the belt or belts N, are pressed together, on the opening of the mould, by the retraction of the cam U, and $u^3$, the tappet, on the stem U', of said cam, by which the lever O' is actuated.

V V, figs. 1 to 3, represent the regulator employed to regulate the rolling-operation, by the adjustment of its respective arms, so as to engage to a greater or less extent with that or those ends of the lining of the mould, the belt or belts N forming one or the other, or both sides of the mould. Said regulator operates by affording distending-points, over which to draw the lining in its movements. It thus lengthens the path of the end engaged with, and proportionately increases the speed of that portion of said end within the mould during the time the greater length of lining to cover this longer path is being supplied through it. In a single-belt machine, the increase in the length of the lining required to stretch between the mould and the operating-lever, is compensated for by the corresponding elevation of the roller P, over which such belt runs, and a consequent decrease in the length of the lining below the mould. The rise of the roller P is permitted by the elongated slot $p$, in which it works. It will consequently be seen that by suitably adjusting it, quite a variety of effects on the rolling may be produced. Serving to increase the speed of that side of the lining of the mould formed by the end with which it engages, as stated, it enables, by being so arranged as to engage with the lining at the proper moments, the automatic production of a grasping-action of the mould to give the wrappers a hold on the fillers at the commencement of their application, which is a great desideratum. The tightness of the wrapping being increased on the engagement of the regulator, and the shape of the cigars being to a very great extent determined by the relative degree of tightness of the wrapping at particular points, the regulator may thus serve further to modify the form of the cigars. The separate adjustability of its arms, as shown, enables the variation of its action, as stated, and also its withdrawal from action, when desired. When said characteristics are not required, such adjustability may, of course, be dispensed with. The adjustment of said arms may be made by set-screws or other suitable means.

$v\ v$ represent the engaging-points of the regulator $V\ V$, consisting of rounded arms simply, as shown, or preferably of suitably supported friction-rollers.

W represents the header;

$W^1$, the vertically-sliding plate, in which said header is mounted, and by which it is advanced and retracted to mould the head of the cigar and release it for removal.

The proposed construction of the header will most readily be seen by reference to figs. 7 to 9. Its frame may be of any suitable form.

X represents the stud or pin employed to press the cigar into the header, and support the same therein; and $X^1$, the sliding frame of said supporting-stud or pin, which frame is adapted to move in a plane parallel to that of the frame $W^1$ of the header W, being connected therewith, so as to move simultaneously with but in opposition to it.

$X^2$ represents a lever pivoted on the frame of the machine, and adapted to engage with one end with the frame $X^1$, so as, by the depression of its other end, to force said frame outward and retract the pin X.

$W^2$ represents a rod or link connecting the end of the lever $X^2$, not engaging with the frame $X^1$ to the frame $W^1$, so as to cause the outward movement of the latter frame, $W^1$, in which it retracts the header, to be imparted through said lever to the former frame, $X^1$, retracting, simultaneously with the header, the supporting-pin X.

$x^1$ represents a sheave, attached to the sliding frame $X^1$;

$w^1$, a cord attached to the frame $W^1$, and running over the sheave $x^1$; and $w^2$, a weight attached to the lower end of the cord $w^1$, to force inward, through said connections, the header W and supporting-stud or pin X.

$w^3\ w^3$ represent sockets or cavities in the sides of the header W, for the reception of the bearings of the upper rollers or supporting-points L M, as represented in fig. 7;

$w^4$, the bell-shaped cavity of the same, in which the head is moulded; and $w^5$, the guide-slot in the front of the same, for engagement with the two sides of the lining of the mould, the belt or belts N, to contract the same, to cause the proper taper of the neck of the cigar in conformity with that of the head, as produced by the matrical portion of its cavity $w^4$, to be produced.

Y represents the curved or rounded plate employed to smooth the wrappers, and enable their introduction properly into the mould, said plate being supported on and forming part of the header-frame $W^1$, and sliding therewith, as shown, or separate and stationary, as preferred.

Z Z' represent respectively the stationary and movable members of the die or punch employed to cut to the proper shape the wrapper for the head, both of which are preferably mounted on and move with the header W.

$z'$, fig. 3, represents a spring, which may be employed to automatically raise and support the movable die $Z'$.

Y' represents the stationary pin employed to assist in guiding the head-wrapper to a point, being supported through suitable connections, and in proper position on the frame of the machine, and adapted to project the proper distance within the header, when it (the header) is in its advanced position, to properly engage with the wrapper.

$w^6$ represents the axial perforation in the header W, for the reception of the pin Y'.

1 2 represent treadles employed, or their equivalent, to operate respectively the feeding and cutting-mechanism, and the mould-closing and opening device; 3 and 4 being respectively the pitmen by which they are connected to a crank-disk, J', on the driving-shaft J of the spur-wheel and knife I, and to the sliding bar U' of the mould-closing cam U.

The machine may be driven by "power," if preferred, and any suitable mechanism employed for transmitting it to the several operative parts, but it has been found preferable, especially in applying wrappers, to have the motion imparted by hand, as then the operator is able to regulate the speed to suit different leaves, as he finds it necessary, and thus to prevent the breakage and consequent waste of wrappers.

The details of construction may obviously be varied, besides in the particulars herein specifically stated, and the combination and arrangement shown may be departed from.

*Operation.*

The operation of my machine, as represented, is as follows:

The filler-tobacco being prepared on the table B, the groove C therein is filled with it, and motion imparted to the driving-shaft J through the treadle 1, operating through the teeth $i$, of the combined spur-wheel and knife I, the rollers E F and apron D.

On a sufficient length, for the gauge of cigars being made, having been fed out into the receiver B', the teeth $i$ having passed out of mesh with the pinion H, the feed is stopped, and the knife $i'$ coming in contact with the strip, severs, by an oblique cut, a lump of the proper size and shape for the cigar. This is drawn off of the receiver B' into the open mould N L L' M M', which is then closed by means of the treadle 2; the two rollers or supporting-points, by the retraction of which the mould is opened, being advanced in proper order to first close the mould, and then apply the pressure of the lower thereto.

The mould being held in its closed position by pressing on the treadle 2, a reciprocating motion is imparted to the belt or belts N, forming the lining of the mould by oscillating the lever S; their proper action, to suit the quality of leaf, character of cigar, &c., being regulated by the adjustment of the regulator V V.

At a proper stage of the rolling-operation, the header W and supporting-pin X, are advanced, by means of the weight $w^2$, the former contracting, by means of the flaring mouth of its bell-shaped matrix $w^4$, and by its slot $w^5$, the edges of the mould-lining N around the neck of the cigar, so as to properly taper the same, and imparting the desired form of head by the rotation of the cigar therein, the proper engagement with the cigar and its support in the header being effected by the pin X.

The rolling being completed, the wrapper, prepared by being cut of the proper width, is introduced over the curved plate Y, and wrapped from the open end to the head, on reaching which it is further prepared by being cut off at the proper length and of the requisite form by the die or punch Z Z', and this end then fed in through the upper end of the slot $w^5$ of the header, being guided to a proper point by the pin Y'. The header and supporting-pin are then retracted by drawing back the former, and the mould opened and its lining loosened by allowing the cam U to descend, when the cigar, complete, except having its end trimmed, is removed. Motion of the treadle 1 having been kept up, by the time the wrapper is applied to one cigar, the filler for another is ready for rolling, and the operation thus rendered continuous. By applying the wrappers at first one and then the other of the portions of the reciprocation of the lining of the mould, right and left wrappers may alternately be used, and thus the stock be regularly consumed.

Different thicknesses, tapers, &c., of cigars may be produced by the same machine, by employing different forms of the rollers or supporting-points L L' M M', which, for this purpose, may be made removable by suitable means, but with the same form of said rollers or supporting-points by the employment of the regulator V V, as described, form as well as tightness may to a very great extent be varied as desired.

To enable different lengths of cigars to be produced, the toothed segment $i$ of the combined spur-wheel and knife I may be made removable by being secured by screws, or in other suitable manner, and by employing different lengths of the same, different lengths of feed may be had, and consequently of cigars.

Claims.

I claim, as new—

1. The combination, with the filler-strip forming and feeding-devices C D E E' F, filler-lump, severing-knife I $i'$, and mould L L' M M' N, of the lump-receiver B', arranged and employed substantially as represented and described for the purpose set forth.

2. The knife I $i'$, constructed of rotary form, and arranged to sever the filler-lumps by oblique or diagonal cuts for the purposes set forth.

3. The combined feed-operating pinion and knife I, constructed and adapted to operate substantially as set forth.

4. The combination of the supporting-points or rollers L L' and M M' respectively, movable and fixed, belts or lining N, lever S and weights, O, substantially as represented and described.

5. In combination with the vertical mould, composed of supporting-points or rollers L L' and M M', respectively, movable and fixed, and belts or lining N, weighted and operated as described, the guide-slot R serving to support the two sides of the lining independent of the supporting-points to form the bottom of the mould, as shown.

6. In combination with belt or belts N, and rollers or supporting-points L L' M M', the weight or weights O, applied to said belt or belts, substantially as described for the purpose set forth.

7. In combination with the belt or belts N and rollers or supporting-points L L' M M', forming the mould, the regulator V V $v$ $v$, constructed and employed substantially as represented and described, for the purposes set forth.

8. The combination, with the belt or belts N, rollers or supporting-points L L' M M', and sliding rod, U' for opening and closing the mould of the lever O', substantially as and for the purpose set forth.

9. In combination with the movable rollers or supporting-points L L', mounted in separate pivoted frames T T', as described, the cam U adapted to operate said frames, substantially in the manner described.

10. In combination with the mould N L L' M M', constructed substantially as described, the header W, provided with the bell-shaped matrix $w^4$, and slot $w^5$, substantially as and for the purpose set forth.

11. In combination with the mould N L L' M M', constructed substantially as described, the header W, provided with the slot $w^5$ and sockets $w^3$ $w^3$ for the reception of the upper rollers or supporting-points L M, as set forth.

12. The header W, and supporting-stud or pin X, combined and arranged substantially as described, and adapted to be simultaneously advanced and retracted, substantially as set forth.

13. The combination, with the header W, of the pin Y', substantially as and for the purpose set forth.

14. In combination with the mould or rolling-apparatus, constructed substantially as described, the rounded plate Y, substantially as and for the purpose set forth.

JOHN WETTSTEIN.

Witnesses:
WILLIAM E. HENNAMAN,
LEWIS J. DE LACOUR.